United States Patent
Shen

(10) Patent No.: US 12,548,184 B2
(45) Date of Patent: Feb. 10, 2026

(54) VIDEO SHOOTING METHOD, VIDEO SHOOTING APPARATUS, AND ELECTRONIC DEVICE

(71) Applicant: VIVO MOBILE COMMUNICATION CO., LTD., Dongguan (CN)

(72) Inventor: Ziying Shen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 428 days.

(21) Appl. No.: 18/125,686

(22) Filed: Mar. 23, 2023

(65) Prior Publication Data
US 2023/0230276 A1 Jul. 20, 2023

Related U.S. Application Data

(63) Continuation of application No. PCT/CN2021/118744, filed on Sep. 16, 2021.

(30) Foreign Application Priority Data

Sep. 23, 2020 (CN) .......................... 202011007515.6

(51) Int. Cl.
*G06T 7/70* (2017.01)
*G06F 3/04817* (2022.01)
*G06T 7/11* (2017.01)

(52) U.S. Cl.
CPC ............ *G06T 7/70* (2017.01); *G06F 3/04817* (2013.01); *G06T 7/11* (2017.01); *G06T 2207/30242* (2013.01)

(58) Field of Classification Search
CPC .......... G06T 7/70; G06T 7/11; G06F 3/04817
USPC .......................................................... 382/103
See application file for complete search history.

(56) References Cited

U.S. PATENT DOCUMENTS

| 9,635,267 B2* | 4/2017 | Lee ...................... H04N 23/667 |
| 9,967,549 B2* | 5/2018 | Cheng .................. H04N 13/221 |
| 10,819,911 B2* | 10/2020 | Ryu ....................... H04N 23/69 |

(Continued)

FOREIGN PATENT DOCUMENTS

| CN | 101321271 A | 12/2008 |
| CN | 103973975 A | 8/2014 |

(Continued)

OTHER PUBLICATIONS

Extended European Search Report issued in related European Application No. 21871394.9, mailed Jan. 22, 2024, 11 pages.

(Continued)

*Primary Examiner* — William D Titcomb
(74) *Attorney, Agent, or Firm* — IPX PLLC

(57) ABSTRACT

A video shooting method, a video shooting apparatus, and an electronic device are provided. The video shooting method includes: receiving a first input performed on a target video preview image, and shooting, in response to the first input, a target video according to N objects selected by the first input in the target video preview image, where the target video includes N sub-videos corresponding to the N objects, each of the sub-videos includes one of the N objects, a shooting range of each of the sub-videos is a range corresponding to a part of screen in the target video preview image, and N is an integer greater than 1.

18 Claims, 7 Drawing Sheets

(56) References Cited

U.S. PATENT DOCUMENTS

| | | | |
|---|---|---|---|
| 2002/0130955 A1* | 9/2002 | Pelletier | H04N 23/695 |
| | | | 348/E5.042 |
| 2010/0238262 A1* | 9/2010 | Kurtz | H04N 7/142 |
| | | | 348/14.01 |
| 2012/0268641 A1 | 10/2012 | Kazama | |
| 2014/0192245 A1* | 7/2014 | Lee | H04N 1/00381 |
| | | | 348/333.05 |
| 2017/0339347 A1 | 11/2017 | Cho et al. | |
| 2018/0069983 A1* | 3/2018 | Cho | H04N 23/632 |
| 2019/0045135 A1* | 2/2019 | Ryu | H04N 23/635 |

FOREIGN PATENT DOCUMENTS

| | | |
|---|---|---|
| CN | 104639916 A | 5/2015 |
| CN | 106961597 A | 7/2017 |
| CN | 108156419 A | 6/2018 |
| CN | 110072070 A | 7/2019 |
| CN | 110121105 A | 8/2019 |
| CN | 111064896 A | 4/2020 |
| CN | 111093026 A | 5/2020 |
| CN | 111669502 A | 9/2020 |
| CN | 111669503 A | 9/2020 |
| CN | 112135046 A | 12/2020 |

OTHER PUBLICATIONS

International Search Report issued in corresponding International Application No. PCT/CN2021/118744, mailed Dec. 15, 2021, 4 pages.

First Office Action issued in related Chinese Application No. 202011007515.6, mailed Jul. 5, 2021, 9 pages.

Second Office Action issued in related Chinese Application No. 202011007515.6, mailed Jan. 28, 2022, 5 pages.

\* cited by examiner

VIDEO SHOOTING METHOD, VIDEO SHOOTING APPARATUS, AND ELECTRONIC DEVICE

CROSS-REFERENCE TO RELATED APPLICATIONS

The application is a continuation of International Application No. PCT/CN2021/118744, filed on Sep. 16, 2021, which claims priority to Chinese Patent Application No. 202011007515.6, filed on Sep. 23, 2020. The entire contents of each of the above-identified applications are expressly incorporated herein by reference.

TECHNICAL FIELD

The present application belongs to the technical field of communications, and in particular, relates to a video shooting method, a video shooting apparatus, and an electronic device.

BACKGROUND

In daily life, there are often scenarios where multiple objects are shot at the same time. For example, in an evening party performance or at a party, videos of multiple persons are shot.

In the above-mentioned shooting scenario, it is found at least the following problems in the related art: if a user needs to obtain a video of multiple specific objects, the user needs to obtain the video of the multiple persons first, and then edit the video to obtain a video that the user needs. The operation process is cumbersome.

SUMMARY

Embodiments of the present disclosure provide a video shooting method, a video shooting apparatus, and an electronic device.

According to a first aspect, an embodiment of the present disclosure provides a video shooting method, the method including:
  receiving a first input performed on a target video preview image; and
  shooting, in response to the first input, a target video according to N objects selected by the first input in the target video preview image;
  where the target video includes N sub-videos corresponding to the N objects, each of the sub-videos includes one of the N objects, a shooting range of each of the sub-videos is a range corresponding to a part of screen in the target video preview image, and N is an integer greater than 1.

According to a second aspect, an embodiment of the present disclosure also provides a video shooting apparatus, the apparatus including:
  a first receiving module, configured to receive a first input performed on a target video preview image; and
  a shooting module, configured to shoot, in response to the first input, a target video according to N objects selected by the first input in the target video preview image;
  where the target video includes N sub-videos corresponding to the N objects, each of the sub-videos includes one of the N objects, a shooting range of each of the sub-videos is a range corresponding to a part of screen in the target video preview image, and N is an integer greater than 1.

According to a third aspect, an embodiment of the present application provides an electronic device, where the electronic device includes a processor, a memory, and a program or an instruction stored in the memory and executable on the processor, and when the program or the instruction is executed by the processor, steps of the method according to the first aspect are implemented.

According to a fourth aspect, an embodiment of the present application provides a readable storage medium, where the readable storage medium stores a program or an instruction, and when the program or the instruction is executed by a processor, the steps of the method according to the first aspect are implemented.

According to a fifth aspect, an embodiment of the present application provides a chip, where the chip includes a processor and a communications interface, the communications interface is coupled to the processor, and the processor is configured to run a program or an instruction, to implement the method according to the first aspect.

According to a sixth aspect, an embodiment of the present application provides a computer program product stored in a readable storage medium, and the computer program product is executed by at least one processor to implement the method according to the first aspect.

According to a seventh aspect, an embodiment of the present application provides a video shooting apparatus, configured to execute the method according to the first aspect.

In the embodiment of the present application, a first input performed on a target video preview image is received, and a target video is shot in response to the first input according to N objects selected by the first input in the target video preview image, where the target video includes N sub-videos corresponding to the N objects, each of the sub-videos includes one of the N objects, a shooting range of each of the sub-videos is a range corresponding to a part of screen in the target video preview image, and N is an integer greater than 1.

DETAILED DESCRIPTION

The following describes the embodiments of the present application with reference to the accompanying drawings in the embodiments of the present application. Apparently, the described embodiments are some rather than all of the embodiments of the present application. Based on the embodiments of the present application, all other embodiments obtained by a person of ordinary skill in the art without creative efforts fall within the protection scope of the present application.

Terms "first" and "second" in the specification and claims of the present application are used to distinguish between similar objects, and do not need to be used to describe a specific order or sequence. It should be understood that the data used in this way is interchangeable in appropriate circumstances so that the embodiments of the present application described can be implemented in other orders than the order illustrated or described herein. In addition, in the specification and the claims, "and/or" represents at least one of connected objects, and a character "/" generally represents an "or" relationship between associated objects.

With reference to the accompanying drawings, the following describes in detail the video shooting method in the embodiments of the present application based on specific embodiments and application scenarios.

Figure 1:
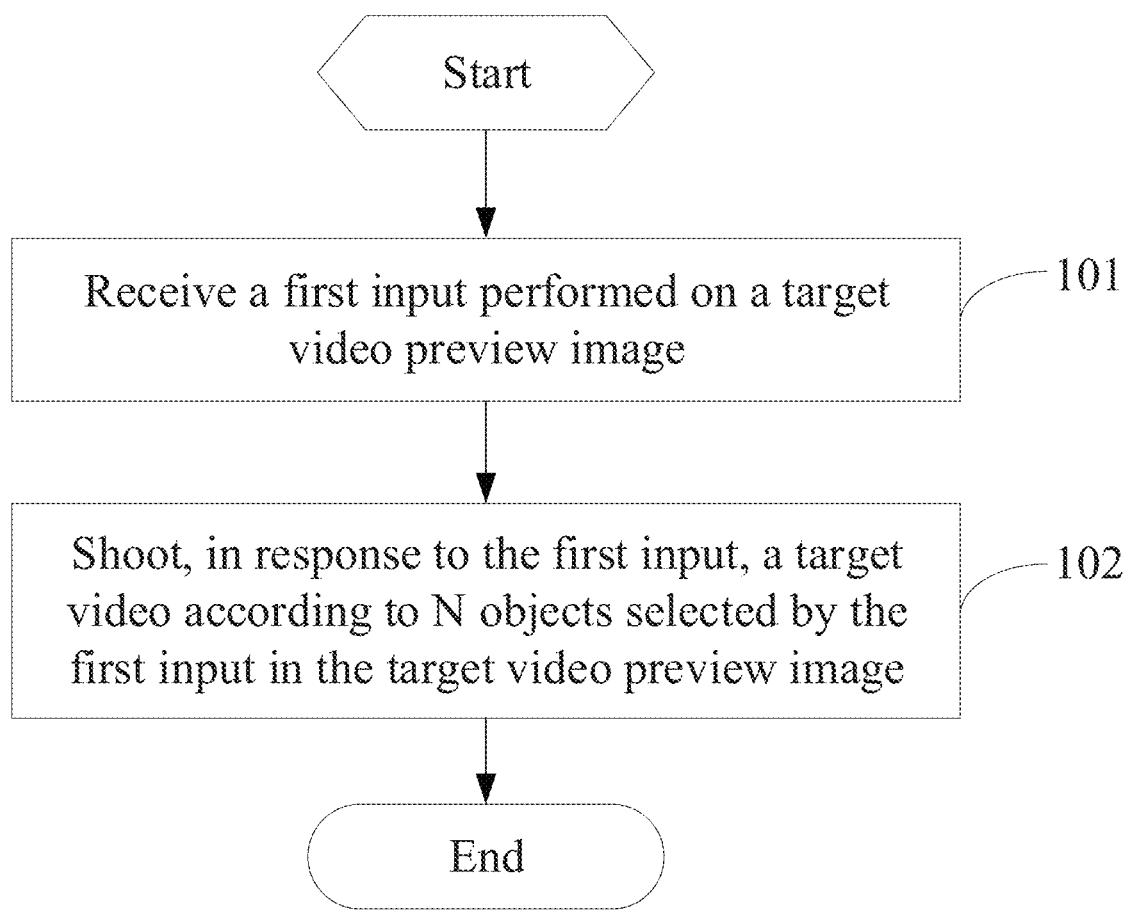
FIG. 1 is a flowchart of a video shooting method according to an embodiment of the present disclosure.

Referring to FIG. 1, FIG. 1 is a flowchart of a video shooting method according to an embodiment of the present disclosure. As shown in FIG. 1, the method includes the following steps:

Step 101. Receive a first input performed on a target video preview image.

In this step, the target video preview image may be a video preview image displayed during video shooting. Based on the video preview image, the user can adjust a display parameter, a shooting range, and the like.

In the process of displaying the target video preview image, the user can operate the target video preview image, that is, perform the first input. The first input can be used to select multiple objects in the target video preview image. The multiple objects can include characters, animals, plants or other objects, which are not limited herein. In some implementations, the first input may be a click operation, a slide operation, a press operation, and the like.

For example, the target video preview image includes ten face images, and the user clicks on three of the ten face images to select the three face images. In addition, the electronic device can also automatically recognize the ten face images, and mark the locations of the ten face images, so that the user can quickly operate an object to be selected.

To prevent misoperations, the user can also select the object in the preview image through operations such as long press and circle selection. In response to the user's operation, the electronic device displays a location of the object selected by the user, and displays a sign of deselection within a preset range where the object is located, so that the user can flexibly select and deselect. If the number of selected objects is greater than a preset number, prompt information may be output to prompt the user to first cancel some of the selected objects, so as to add objects again.

Figure 2:
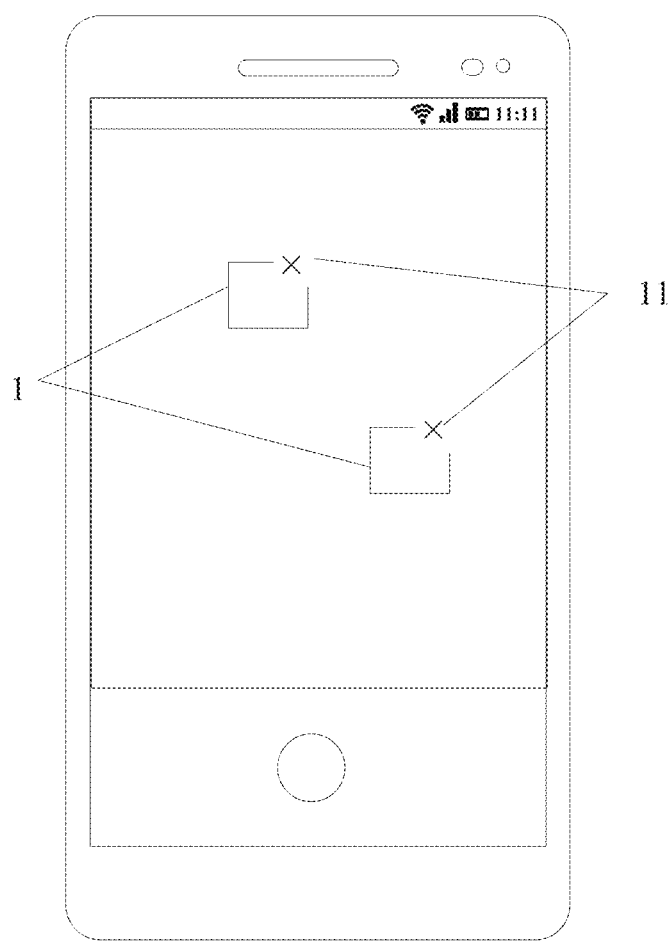
FIG. 2 to FIG. 6 are schematic structural diagrams of interfaces of an electronic device according to an embodiment of the present disclosure.

As shown in FIG. 2, the electronic device displays locations of two objects 1 according to the user's operation, and displays a deselected icon 11 near each object 1, and by operating the icon 11, the user can deselect the object corresponding to the icon 11.

If the user does not select or only selects one shooting object within the preset time, the normal video shooting mode can be followed. After selecting multiple objects, the user can operate the icon of the multi-view shooting mode to enter the multi-view shooting mode, in which the icon of the multi-view shooting mode remains highlighted. The user can click on the icon of the multi-view shooting mode to exit from the shooting mode, and then the electronic device previews the screen according to the conventional video shooting mode in the related art.

Step 102. Shoot, in response to the first input, a target video according to N objects selected by the first input in the target video preview image.

The target video includes N sub-videos corresponding to the N objects, each of the sub-videos includes one of the N objects, a shooting range of each of the sub-videos is a range corresponding to a part of screen in the target video preview image, and N is an integer greater than 1.

In this step, the electronic device may shoot the target video in response to the user's first input. For example, after a preset time from a moment at which the user performs the first input, the target video is shot; or prompt information indicating that the target video is to be shot is output, to prompt the user whether to switch the shooting mode, and the target video is shot when the user does not switch the shooting mode.

In addition, in this step, the target video may also be shot based on the user's fourth input. The fourth input may be an input for triggering a shooting instruction, for example, an operation on a shooting button, or a voice input. When the fourth input is received, the electronic device shoots the target video.

The target video may include N sub-videos, and each sub-video uses one object as a shooting subject. In this way, N sub-videos respectively using N objects as shooting subjects can be obtained. The one object may include one or more characters selected by the user, and may also be one or more animals, plants, or other objects. In sonic implementations, a part of video range of the screen including the selected object may be output. For example, the target video preview image includes five persons, and person A and person B are respectively used as shooting objects to obtain a first sub-video with person A as a shooting subject and a second sub-video with person B as a shooting subject. The shooting range of each sub-video can be preset, or set based on user operations. For example, a field of view range of a square that uses the location of the selected object in the video screen as the center point and whose side length is a preset length is used as the shooting range of the sub-video, and the sub-video is output; or the selected object is displayed at a specific location, and a rectangular range including the object is used as the shooting range to improve the display effect of the video.

Figure 3:
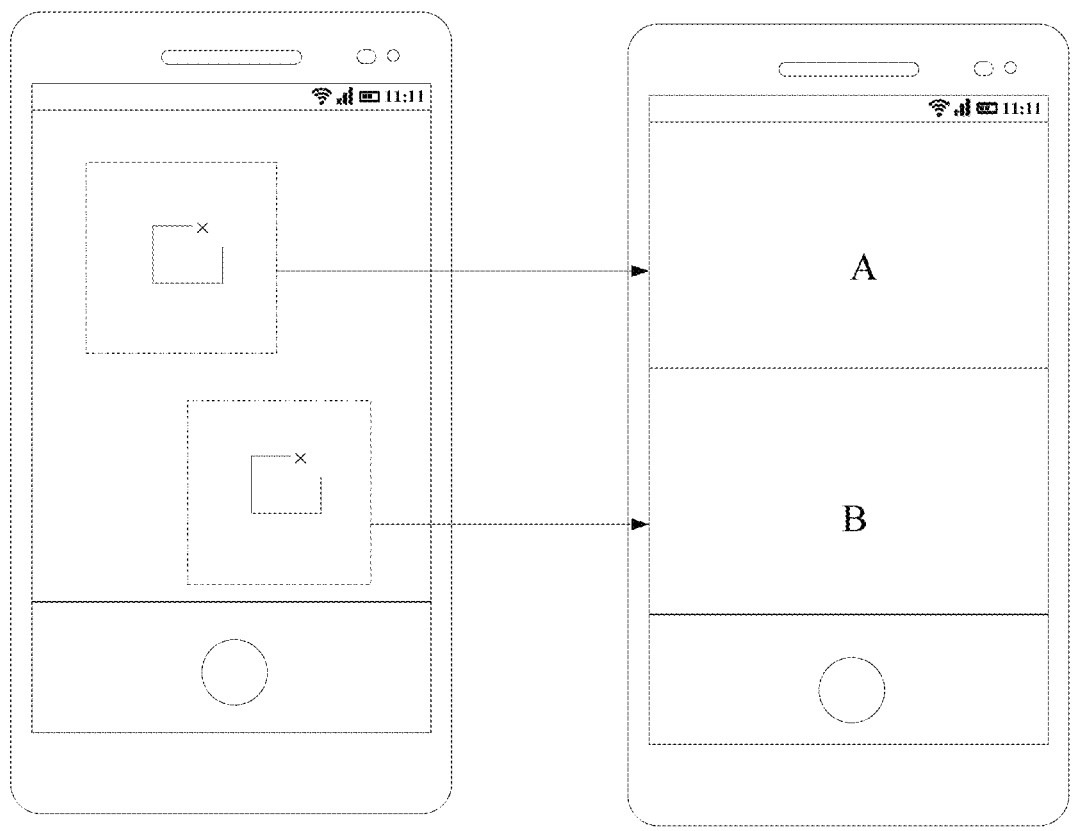

As shown in FIG. 3, for example, two objects are selected. Square ranges that use the two objects as the center respectively and use half of the screen width of the target video as a side length are used, and video screens within the ranges are output to upper and lower shooting windows in the display interface, that is, display window A and display window B. By default, the video screen of the object selected first is displayed on the top.

Further, the shooting range of the N sub-videos can also be determined according to the location of the object in the target video preview image, so that the shooting effect of the sub-videos can be ensured.

In some implementations, the target video further includes at least one of the following: a video including the N sub-videos, and a video corresponding to the target video preview image. While shooting independent N sub-videos, a preview image corresponding to the target video or a video including multiple sub-videos can also be obtained. In this way, in the scenario of shooting multi-person videos, the multiple videos can meet the needs of different users. In addition, the user can obtain any one of the above-mentioned video types by presetting or according to default setting, so as to meet the needs of users.

In the embodiments of the present application, the electronic device can output multiple videos for different objects according to the object selected by the user, so as to improve the effect of each sub-video and meet the needs of users.

Moreover, the above process does not require the user to perform an editing operation, which can improve operation efficiency.

In some implementations, after the receiving a first input performed on a target video preview image and before the shooting a target video, the method further includes:

divide, in response to the first input, a target preview window corresponding to the target video preview image into N preview sub-windows; and respectively displaying N sub-video preview images in the N preview sub-windows;

where each sub-video preview image corresponds to one sub-video in the N sub-videos.

In this embodiment, after the user performs the first input on the target video preview image, the electronic device may display N preview sub-windows in response to the user's first input. The N preview sub-windows can be displayed above the target video preview image, for example, displayed in a floating manner, or a video preview window can be added for display. In some implementations, the target preview window corresponding to the target video preview image is divided into N preview sub-windows, and N sub-video preview images are respectively displayed in the N preview sub-windows. Each preview sub-window uses an object as a shooting subject, and the object used as the shooting subject is displayed at a predetermined location of the sub-video preview image.

The user can preview the effect of the video based on the N sub-video preview images, which can improve the effect of the image.

In some implementations, after the respectively displaying N sub-video preview images in the N preview sub-windows, the method further includes:

receiving a second input performed on a first sub-video preview image of the N sub-video preview images; and adjust a shooting parameter of the first sub-video preview image in response to the second input; and the shooting a target video includes:

shooting a first sub-video according to the adjusted shooting parameter based on the first sub-video preview image, where the first sub-video is one of the N sub-videos.

In this embodiment, after the N sub-video preview images are displayed, the user may perform a second input on any one of the N sub-video preview images, so as to adjust shooting parameter of the operated sub-video preview image.

Figure 4:
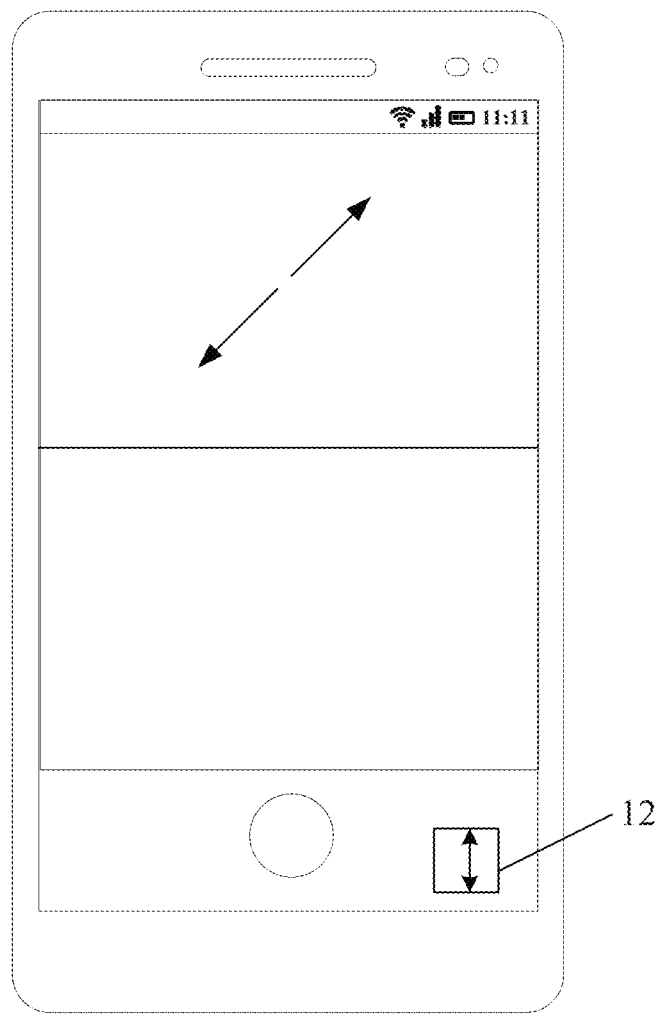

The second input may be a click operation, a slide operation, a two-finger drag operation, etc., which are not limited herein. For example, as shown in FIG. 4, if the user performs a slide operation on the first sub-video preview image with two fingers moving towards each other or moving in opposite directions, the first sub-video preview image is zoomed in or zoomed out according to the user's operation. The user can also perform other operations to adjust other shooting parameters, such as the focal length of the video image, beautification effect, brightness, etc., and the first sub-video preview image displays a shooting preview screen based on the adjusted shooting parameter. In addition, the user can operate the icon 12 displayed on the screen, to switch video content in the two display windows.

The user can preview the effect of the video based on the first sub-video preview image. When shooting the target video, the electronic device shoots the first sub-video based on the adjusted shooting parameter. The first sub-video is a video shot based on the first sub-video preview image.

In this embodiment, the user can adjust a shooting parameter of any sub-video preview image according to the shooting scenario, the operation mode is flexible, and the shooting effect of the sub-video can be improved.

In some implementations, after the receiving a first input performed on a target video preview image and before the shooting a target video, the method further includes:

displaying N sub-video preview images in response to the first input, where each of the sub-video preview images corresponds to one of the N sub-videos;

receiving a third input performed on a second sub-video preview image of the N sub-video preview images; and displaying a first icon in the target video preview image in response to the third input; and adjusting a preview range of the second sub-video preview image, and adjusting a display location of the first icon in the target video preview image according to the adjusted preview range;

where the first icon is used to indicate a shooting range corresponding to the second sub-video preview image in the target video preview image, and the second sub-video preview image before adjusting the preview range and the second sub-video preview image after adjusting the preview range both include the same object of the N objects.

In this embodiment, before displaying the N sub-videos, the electronic device first displays preview images of N sub-videos, that is, N sub-video preview images, and the user can preview or adjust the effect of the video image based on each sub-video preview image.

In some implementations, the user may perform a third input on the second sub-vide preview image, for example, a click operation, a drag operation, or a press operation. In response to the user's operation, the electronic device displays the first icon in the target video preview image, where the shooting range of the first icon corresponding to the target video preview image is the same as the shooting range of the second sub-video preview image, that is, shooting content within the shooting range is the same. When the user performs the third input, if the target video preview image is not displayed on the screen, the target video preview image may first be displayed in the target area, and the first icon may be displayed in the target video preview image. The user can adjust the second sub-video preview image based on the location of the first icon in the target video preview image.

Figure 5:
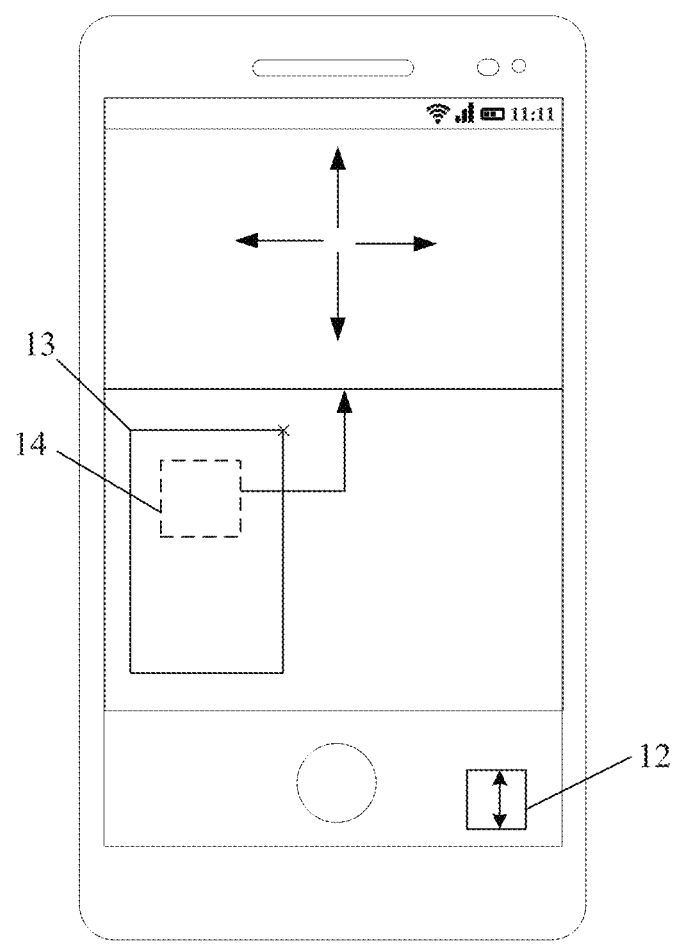

For example, as shown in FIG. 5, the electronic device displays two upper and lower display windows, and the two display windows respectively display two sub-video preview images. The user performs a drag operation on the upper second sub-video preview image to adjust the shooting preview range of the second sub-video preview image. When the second sub-video preview image is operated, a display window of a target video preview image 13 is displayed in the lower display window of the screen in a floating manner, a first icon 14 is displayed in the target video preview image 13, and the first icon 14 can be used to indicate a shooting preview range of the second sub-video preview image in the target video preview image 13. When the user adjusts the shooting preview range of the second sub-video preview image, the location of the first icon 14 also changes accordingly, which is convenient for the user to adjust the shooting preview range of the second sub-video preview image according to the location of the first icon. If the user does not need to check the location of the first icon 14 or the shooting range has been adjusted, the floating display window where the target video preview image 13 is located can be closed.

In this implementation, the user can adjust the shooting preview range of the second sub-video preview image based on the first icon and the target video preview image, so that the user can obtain a second sub-video with the better effect according to the shooting requirements, thereby catering to the shooting requirements of different users.

In some implementations, the N objects selected by the first input include a first object; and the shooting, in response to the first input, a target video according to N objects selected by the first input in the target video preview image includes:

obtaining a first location of the first object in the target video preview image; and shooting, according to the first location, a first sub-video including the first object;

where a second location of the first object in the first sub-video is associated with the first location.

In this embodiment, the electronic device obtains a first location of the first object in the target video preview image, and according to the first location, can determine the location of the first object in the first sub-video. Since the location of the first object in the first sub-video is associated with the shooting range of the first sub-video, that is, the shooting range of the first sub-video can also be determined according to the first location.

Figure 6:
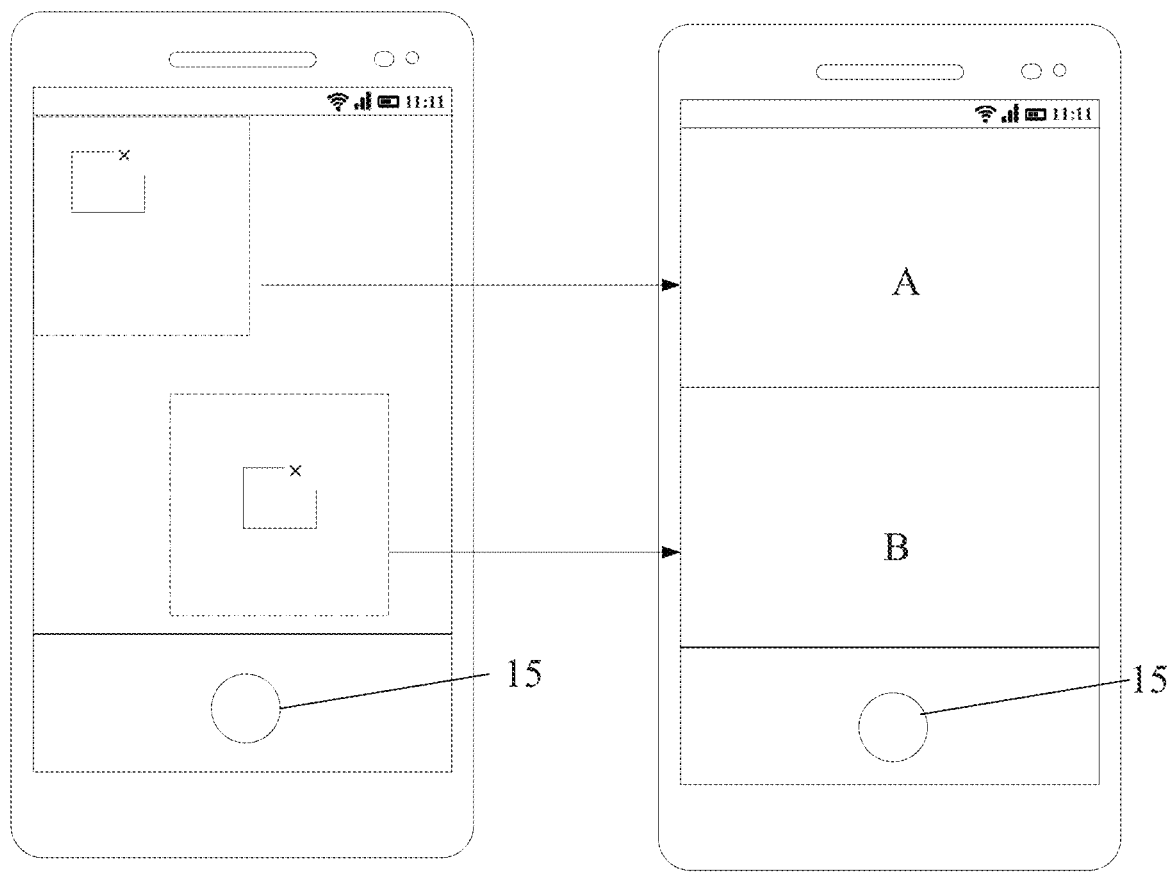

In some implementations, when the first object is located in the middle area of the target video preview image, a video within target field of view can be obtained with the first object as the center, to serve as the first sub-video. As shown in FIG. 6, a video image corresponding to field of view with the first object as the center is displayed in display window B. When the first object is located in the edge area of the target video preview image, a video within target field of view including the first object can be used as the first sub-video. As shown in FIG. 6, the video image corresponding to the field of view including the first object is displayed in display window A. For example, a location near the edge may be used as a start point, and then square field of view is increased by ½ of a width of the original preview screen.

After the location of the first object in the first sub-video is determined according to the above method, the user can further make adjustments according to the operation process in the above implementation, to obtain the shooting range required by the user. After adjusting the preview image, the user can operate a shooting button 15 shown in FIG. 6 to perform a video shooting operation.

In this implementation, the location of the first object in the first sub-video is determined based on the location of the first object in the target video preview image, and the shooting range of the first sub-video can be flexibly controlled, so that the shooting effect of the image is better.

In some implementations, after the receiving a first input performed on a target video preview image, the method further includes:

obtaining an input parameter of the first input; and determining shooting parameters of M sub-videos according to the input parameter, where the M sub-videos are sub-videos respectively corresponding to M objects of the N objects; and the shooting a target video includes:

shooting the M sub-videos according to the shooting parameters;

where M is an integer greater than 0, and M≤N.

In this implementation, when the user performs the first input, an input parameter of the first input may be obtained, so as to determine, according to the input parameter, the shooting parameter corresponding to the object.

In some implementations, shooting parameters of multiple objects may be determined according to the input parameter of the first input, and the multiple objects may be preset objects, and may be all or some of the N objects. When the first input includes multiple sub-inputs, an input parameter of each sub-input may be obtained. Each sub-input corresponds to an object, and each object corresponds to a sub-video. Therefore, based on the input parameter of each sub-input, a shooting parameter of the sub-video corresponding to each sub-input can be determined.

For example, the user selects two objects in the target video preview image through a pressing operation. When the user selects the first object, the pressing time is t1, and when the user selects the second object, the pressing time is t2. The electronic device obtains the shooting parameter corresponding to t1, and shoots, according to the shooting parameter, the sub-video corresponding to the first object; and obtains the shooting parameter corresponding to t2, and shoots, according to the shooting parameter, the sub-video corresponding to the second object.

In this way, during the user's operation, the shooting parameter can be determined based on the user's input parameter, which can improve the operation efficiency and reduce the user's operations.

The video shooting method of the embodiments of the present disclosure can perform, when the user uses an electronic device to shoot a video, synchronous targeted video shooting of multiple objects spaced at a certain distance.

It should be noted that, the video shooting method provided in the embodiments of the present application may be executed by a video shooting apparatus, or a control module in the video shooting apparatus for executing the video shooting method. In the embodiments of the present application, an example in which the video shooting apparatus performs the video shooting method is used to describe the video shooting method provided in the embodiments of the present application.

Figure 7:
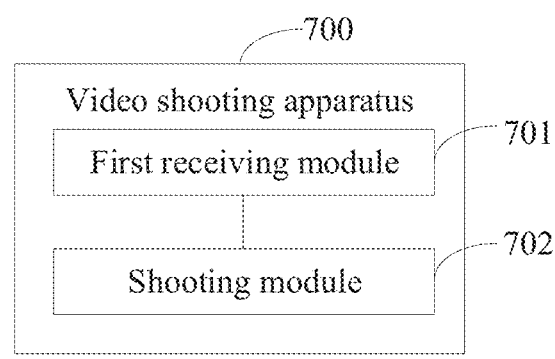
FIG. 7 is a structural diagram of a video shooting apparatus according to an embodiment of the present disclosure.

Referring to FIG. 7, FIG. 7 is a structural diagram of a video shooting apparatus according to an embodiment of the present disclosure. As shown in FIG. 7, a video shooting apparatus 700 includes:

a first receiving module 701, configured to receive a first input performed on a target video preview image; and a shooting module 702, configured to shoot, in response to the first input, a target video according to N objects selected by the first input in the target video preview image;

where the target video includes N sub-videos corresponding to the N objects, each of the sub-videos includes one of the N objects, a shooting range of each of the sub-videos is a range corresponding to a part of screen in the target video preview image, and N is an integer greater than 1.

In some implementations, the apparatus further includes:

a division module, configured to divide, in response to the first input, a target preview window corresponding to the target video preview image into N preview sub-windows; and a first display module, configured to respectively display N sub-video preview images in the N preview sub-windows;

where each sub-video preview image corresponds to one sub-video in the N sub-videos.

In some implementations, the apparatus further includes:
a second receiving module, configured to receive a second input performed on a first sub-video preview image of the N sub-video preview images; and
a first adjustment module, configured to adjust a shooting parameter of the first sub-video preview image in response to the second input; and
the shooting module is configured to:
shoot a first sub-video according to the adjusted shooting parameter based on the first sub-video preview image, where the first sub-video is one of the N sub-videos.

In some implementations, the apparatus further includes:
a second display module, configured to display N sub-video preview images in response to the first input, where each of the sub-video preview images corresponds to one of the N sub-videos;
a third receiving module, configured to receive a third input performed on a second sub-video preview image of the N sub-video preview images; and
a third display module, configured to display a first icon in the target video preview image in response to the third input; and
a second adjustment module, configured to adjust a preview range of the second sub-video preview image, and adjust a display location of the first icon in the target video preview image according to the adjusted preview range;
where the first icon is used to indicate a shooting range corresponding to the second sub-video preview image in the target video preview image, and the second sub-video preview image before adjusting the preview range and the second sub-video preview image after adjusting the preview range both include the same object of the N objects.

In some implementations, the N objects selected by the first input include a first object; and the shooting module includes:
an obtaining submodule, configured to obtain a first location of the first object in the target video preview image; and
a shooting submodule, configured to shoot, according to the first location, a first sub-video including the first object;
where a second location of the first object in the first sub-video is associated with the first location.

In some implementations, the apparatus further includes:
an obtaining module, configured to obtain an input parameter of the first input; and
a determining module, configured to determine shooting parameters of NI sub-videos according to the input parameter, where the M sub-videos are sub-videos respectively corresponding to M objects of the N objects; and
the shooting module is configured to:
shoot the M sub-videos according to the shooting parameters;
where M is an integer greater than 0, and M≤N.

The video shooting apparatus 700 can implement the processes implemented by the electronic device in the foregoing method embodiment and achieve a same beneficial effect. To avoid repetition, details are not described herein again.

The video shooting apparatus in the embodiments of the present application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle terminal, a wearable device, an Ultra-Mobile Personal Computer (UMPC), a netbook, or a Personal Digital Assistant (PDA). The non-mobile electronic device may be a server, a Network Attached Storage (NAS), a personal computer, a television, an automated teller machine or a self-service machine. This is not specifically limited in the embodiments of the present application.

The video shooting apparatus in the embodiments of the present application may be an apparatus with an operating system. The operating system may be an Android operating system, may be an iOS operating system, or may be another possible operating system, which is not specifically limited in the embodiments of the present application.

The video shooting apparatus provided in this embodiment of the present application can implement processes implemented by the video shooting apparatus in the method embodiments of FIG. 1 to FIG. 6. To avoid repetition, details are not described herein again.

In this embodiment of the present application, based on the multiple objects selected by the user, multiple videos can be shot with these objects as shooting objects, which can reduce user operations.

In some implementations, an embodiment of the present application further provides an electronic device, including a processor, a memory, and a program or an instruction stored in the memory and executable on the processor. When the program or instruction is executed by the processor, each process of the embodiment of the foregoing video shooting method. To avoid repetition, details are not repeated herein.

It should be noted that the electronic device in this embodiment of the present application includes the foregoing mobile electronic device and the foregoing non-mobile electronic device.

Figure 8:
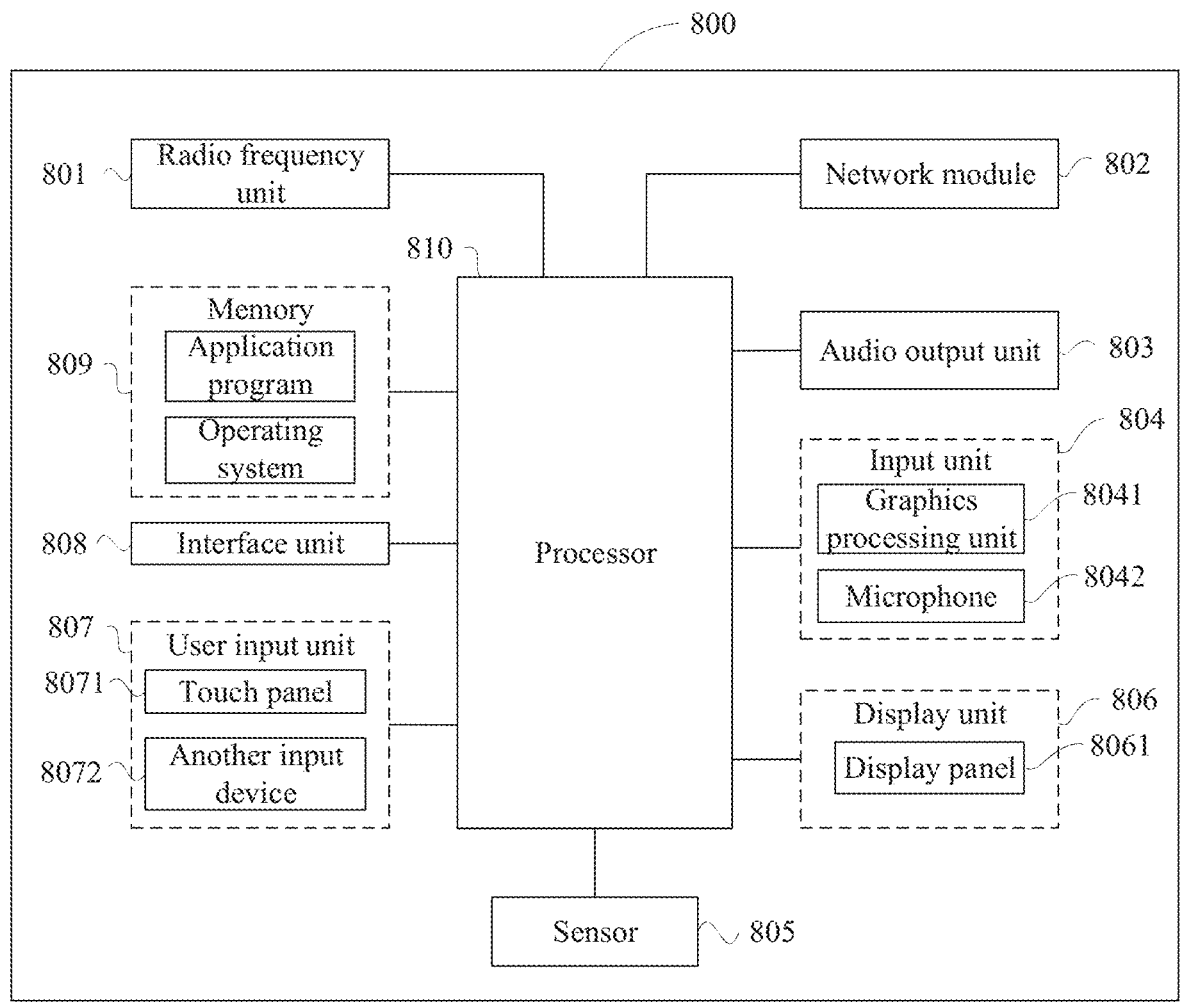
FIG. 8 is a structural diagram of an electronic device according to an embodiment of the present disclosure.

FIG. 8 is a schematic diagram of a hardware structure of an electronic device for implementing embodiments of the present application.

The electronic device 800 includes, but is not limited to: a radio frequency unit 801, a network module 802, an audio output unit 803, an input unit 804, a sensor 805, a display unit 806, a user input unit 807, an interface unit 808, a memory 809, a processor 810, etc.

It may be understood by a person skilled in the art that the electronic device 800 may further include a power supply (such as a battery) that supplies power to each component. The power supply may be logically connected to the processor 810 by using a power management system, to implement functions such as charging, discharging, and power consumption management by using the power management system. A structure of the electronic device shown in FIG. 8 does not constitute a limitation on the electronic device, and may include more or fewer parts than those shown in the figure, or combine some components, or have different part arrangements. Details are not described herein again.

The processor 810 is configured to:
control the user input unit 807 to receive a first input performed on a target video preview image; and
shoot, in response to the first input, a target video according to N objects selected by the first input in the target video preview image;
where the target video includes N sub-videos corresponding to the N objects, each of the sub-videos includes one of the N objects, a shooting range of each of the sub-videos is a range corresponding to a part of screen in the target video preview image, and N is an integer greater than 1.

In some implementations, the processor 810 is further configured to:
- divide, in response to the first input, a target preview window corresponding to the target video preview image into N preview sub-windows; and
- control the display unit 806 to respectively display N sub-video preview images in the N preview sub-windows;
- where each sub-video preview image corresponds to one sub-video in the N sub-videos.

In some implementations, the processor 810 is further configured to:
- control the user input unit 807 to receive a second input performed on a first sub-video preview image of the N sub-video preview images; and
- adjust a shooting parameter of the first sub-video preview image in response to the second input; and
- the shooting a target video by the processor 810 includes:
- shooting a first sub-video according to the adjusted shooting parameter based on the first sub-video preview image, where the first sub-video is one of the N sub-videos.

In some implementations, the processor 810 is further configured to:
- control the display unit 806 to display N sub-video preview images in response to the first input, where each of the sub-video preview images corresponds to one of the N sub-videos;
- control the user input unit 807 to receive a third input performed on a second sub-video preview image of the N sub-video preview images; and
- control the display unit 806 to display a first icon in the target video preview image in response to the third input; and
- adjust a preview range of the second sub-video preview image, and adjust a display location of the first icon in the target video preview image according to the adjusted preview range;
- where the first icon is used to indicate a shooting range corresponding to the second sub-video preview image in the target video preview image, and the second sub-video preview image before adjusting the preview and the second sub-video preview image after adjusting the preview both include the same object of the N objects.

In some implementations, the N objects selected by the first input include a first object; and the shooting, by the processor 810 in response to the first input, a target video according to N objects selected by the first input in the target video preview image includes:
- obtaining a first location of the first object in the target video preview image; and
- shooting, according to the first location, a first sub-video including the first object;
- where a second location of the first object in the first sub-video is associated with the first location.

In some implementations, the processor 810 is further configured to:
- obtaining an input parameter of the first input; and
- determining shooting parameters of M sub-videos according to the input parameter, where the M sub-videos are sub-videos respectively corresponding to M objects of the N objects; and
- the shooting a target video by the processor 810 includes:
- shoot the M sub-videos according to the shooting parameters;
- where M is an integer greater than 0, and M≤N.

In this embodiment of the present application, based on the multiple objects selected by the user, multiple videos can be shot with these objects as shooting objects, which can reduce user operations.

It should be understood that, in this embodiment of the present application, the input unit 804 may include a Graphics Processing Unit (GPU) 8041 and a microphone 8042, and the graphics processing unit 8041 processes image data of a still picture or a video obtained by an image capture apparatus (such as a camera) in a video capture mode or an image capture mode. The display unit 806 may include a display panel 8061, and the display panel 8061 may be configured in a form of a liquid crystal display, an organic light-emitting diode, or the like. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein. The memory 809 may be configured to store a software program and various data, including but not limited to an application program and an operating system. The processor 810 may be integrated with an application processor and a modem processor. The application processor mainly processes an operating system, a user interface, an application program, and the like, and the modem processor mainly processes wireless communication. It can be understood that, in some implementations, the modem processor may not be integrated into the processor 810.

An embodiment of the present application further provides a readable storage medium. The readable storage medium stores a program or an instruction, and when the program or the instruction is executed by a processor, each process of the embodiment of the foregoing video shooting method is performed. To avoid repetition, details are not described herein again.

The processor is a processor in the electronic device in the foregoing embodiment. The readable storage medium includes a computer-readable storage medium such as a computer Read-Only Memory (ROM), a Random Access Memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing video shooting method and the same technical effects can be achieved. To avoid repetition, details are not described herein again.

It should be understood that the chip mentioned in this embodiment of the present application may also be referred to as a system-level chip, a system chip, a chip system, or a system on a chip.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of the present application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. Based on such an understanding, the technical solutions of the present application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present application.

It should be understood that division of modules is merely logical function division. The modules may be all or partially integrated in a physical entity or may be physically separated in an actual implementation. The modules may be all implemented in a form of software invoked by a processing component, or may be all implemented in a form of hardware; or a part of modules may be implemented in a form of software invoked by a processing component, and another part of modules may be implemented in a form of hardware. For example, a receiving module may be a processing element separately disposed, or may be integrated in a chip of the foregoing apparatus for implementation. In addition, the receiving module may be stored in a memory of the foregoing apparatus in a form of program code, and is invoked by a processing element of the foregoing apparatus to perform a function of the foregoing receiving module. The implementations of other modules are similar thereto. In addition, the modules may be all or partially integrated, or may be implemented independently. The processing element herein may be an integrated circuit having a signal processing capability. During implementation, various steps of the foregoing method or the foregoing modules may be completed through an integrated logic circuit of the hardware in the processor element or a command in the form of software.

For example, the modules, units, sub-units, or sub-modules may be one or more integrated circuits configured to implement the foregoing methods, for example, one or more Application Specific Integrated Circuit (ASIC), one or more microprocessors (Digital Signal Processor (DSP)), or one or more Field Programmable Gate arrays (FPGA). For another example, when a module above is implemented by invoking program code by using a processing element, the processing element may be a general-purpose processor, for example, a Central Processing Unit (CPU) or another processor that can invoke program code. For another example, these modules may be integrated and implemented in a form of a System-On-a-Chip (SOC).

The embodiments of the present application are described with reference to the accompanying drawings. However, the present application is not limited to the foregoing specific implementations. The foregoing specific implementations are merely examples, but are not limiting. A person of ordinary skill in the art may make many forms without departing from the objective and the scope of the claims of the present application, and these forms all fall within the protection scope of the present application.

The invention claimed is:

1. A video shooting method, comprising:
receiving a first input selecting N objects on a target video preview image;
displaying N sub-video preview images, wherein each of the sub-video preview images corresponds to one of the N objects;
receiving a sub-video adjustment input performed on a target sub-video preview image among the N sub-video preview images;
adjusting a preview range of the target sub-video preview image; and
shooting, in response to the first input, a target video according to the N objects selected by the first input in the target video preview image,
wherein the target video comprises N sub-videos corresponding to the N objects, each of the sub-videos comprises one of the N objects, a shooting range of each of the sub-videos is a range corresponding to a part of screen in the target video preview image, and N is an integer greater than 1.

2. The method according to claim 1, wherein after the receiving a first input selecting N objects on a target video preview image and before the shooting a target video, the method further comprises:
dividing, in response to the first input, a target preview window corresponding to the target video preview image into N preview sub-windows; and
respectively displaying the N sub-video preview images in the N preview sub-windows,
wherein each sub-video preview image corresponds to one sub-video in the N sub-videos.

3. The method according to claim 2, wherein after the respectively displaying the N sub-video preview images in the N preview sub-windows, the method further comprises:
receiving a second input performed on a first sub-video preview image of the N sub-video preview images; and
adjusting a shooting parameter of the first sub-video preview image in response to the second input; and
the shooting a target video comprises:
shooting a first sub-video according to the adjusted shooting parameter based on the first sub-video preview image, wherein the first sub-video is one of the N sub-videos.

4. The method according to claim 1, wherein after the receiving a first input selecting N objects on a target video preview image and before the shooting a target video, the method further comprises:
displaying a first icon in the target video preview image in response to the sub-video adjustment input; and
adjusting a display location of the first icon in the target video preview image according to the adjusted preview range,
wherein the first icon is used to indicate a shooting range corresponding to the target sub-video preview image in the target video preview image, and the target sub-video preview image before adjusting the preview range and the target sub-video preview image after adjusting the preview range both comprise the same object of the N objects.

5. The method according to claim 1, wherein the N objects selected by the first input comprise a first object; and the shooting, in response to the first input, a target video according to the N objects selected by the first input in the target video preview image comprises:
obtaining a first location of the first object in the target video preview image; and
shooting, according to the first location, a first sub-video comprising the first object,
wherein a second location of the first object in the first sub-video is associated with the first location.

6. The method according to claim 1, wherein after the receiving a first input of a target video preview image, the method further comprises:
obtaining an input parameter of the first input; and
determining shooting parameters of M sub-videos according to the input parameter, wherein the M sub-videos are sub-videos respectively corresponding to M objects of the N objects; and
the shooting a target video comprises:
shooting the M sub-videos according to the shooting parameters,
wherein M is an integer greater than 0, and M≤N.

7. An electronic device, comprising:
a memory storing computer-readable instructions; and
a processor coupled to the memory and configured to execute the computer-readable instructions, wherein the computer-readable instructions, when executed by the processor, cause the processor to perform operations comprising:
receiving a first input selecting N objects on a target video preview image;
displaying N sub-video preview images, wherein each of the sub-video preview images corresponds to one of the N objects;
receiving a sub-video adjustment input performed on a target sub-video preview image among the N sub-video preview images;
adjusting a preview range of the target sub-video preview image; and
shooting, in response to the first input, a target video according to the N objects selected by the first input in the target video preview image,
wherein the target video comprises N sub-videos corresponding to the N objects, each of the sub-videos comprises one of the N objects, a shooting range of each of the sub-videos is a range corresponding to a part of screen in the target video preview image, and N is an integer greater than 1.

8. The electronic device according to claim 7, wherein after the receiving a first input selecting N objects on a target video preview image and before the shooting a target video, the operations further comprise:
dividing, in response to the first input, a target preview window corresponding to the target video preview image into N preview sub-windows; and
respectively displaying the N sub-video preview images in the N preview sub-windows,
wherein each sub-video preview image corresponds to one sub-video in the N sub-videos.

9. The electronic device according to claim 8, wherein after the respectively displaying the N sub-video preview images in the N preview sub-windows, the operations further comprise:
receiving a second input performed on a first sub-video preview image of the N sub-video preview images; and
adjusting a shooting parameter of the first sub-video preview image in response to the second input; and
the shooting a target video comprises:
shooting a first sub-video according to the adjusted shooting parameter based on the first sub-video preview image, wherein the first sub-video is one of the N sub-videos.

10. The electronic device according to claim 7, wherein after the receiving a first input selecting N objects on a target video preview image and before the shooting a target video, the operations further comprise:
displaying a first icon in the target video preview image in response to the sub-video adjustment input; and
adjusting a display location of the first icon in the target video preview image according to the adjusted preview range,
wherein the first icon is used to indicate a shooting range corresponding to the target sub-video preview image in the target video preview image, and the target sub-video preview image before adjusting the preview range and the target sub-video preview image after adjusting the preview range both comprise the same object of the N objects.

11. The electronic device according to claim 7, wherein the N objects selected by the first input comprise a first object; and the shooting, in response to the first input, a target video according to the N objects selected by the first input in the target video preview image comprises:
obtaining a first location of the first object in the target video preview image; and
shooting, according to the first location, a first sub-video comprising the first object,
wherein a second location of the first object in the first sub-video is associated with the first location.

12. The electronic device according to claim 7, wherein after the receiving a first input of a target video preview image, the operations further comprise:
obtaining an input parameter of the first input; and
determining shooting parameters of M sub-videos according to the input parameter, wherein the M sub-videos are sub-videos respectively corresponding to M objects of the N objects; and
the shooting a target video comprises:
shooting the M sub-videos according to the shooting parameters,
wherein M is an integer greater than 0, and MSN.

13. A non-transitory computer-readable medium storing instructions that, when executed by the processor, cause the processor to perform operations comprising:
receiving a first input selecting N objects on a target video preview image;
displaying N sub-video preview images, wherein each of the sub-video preview images corresponds to one of the N objects;
receiving a sub-video adjustment input performed on a target sub-video preview image among the N sub-video preview images;
adjusting a preview range of the target sub-video preview image; and
shooting, in response to the first input, a target video according to the N objects selected by the first input in the target video preview image,
wherein the target video comprises N sub-videos corresponding to the N objects, each of the sub-videos comprises one of the N objects, a shooting range of each of the sub-videos is a range corresponding to a part of screen in the target video preview image, and N is an integer greater than 1.

14. The non-transitory computer-readable medium according to claim 13, wherein after the receiving a first input selecting N objects on a target video preview image and before the shooting a target video, the operations further comprise:
dividing, in response to the first input, a target preview window corresponding to the target video preview image into N preview sub-windows; and
respectively displaying the N sub-video preview images in the N preview sub-windows,
wherein each sub-video preview image corresponds to one sub-video in the N sub-videos.

15. The non-transitory computer-readable medium according to claim 14, wherein after the respectively displaying the N sub-video preview images in the N preview sub-windows, the operations further comprise:
receiving a second input performed on a first sub-video preview image of the N sub-video preview images; and
adjusting a shooting parameter of the first sub-video preview image in response to the second input; and
the shooting a target video comprises:
shooting a first sub-video according to the adjusted shooting parameter based on the first sub-video preview image, wherein the first sub-video is one of the N sub-videos.

16. The non-transitory computer-readable medium according to claim 13, wherein after the receiving a first input selecting N objects on a target video preview image and before the shooting a target video, the operations further comprise:
displaying a first icon in the target video preview image in response to sub-video adjustment input; and
adjusting a display location of the first icon in the target video preview image according to the adjusted preview range,
wherein the first icon is used to indicate a shooting range corresponding to the target sub-video preview image in the target video preview image, and the target sub-video preview image before adjusting the preview range and the target sub-video preview image after adjusting the preview range both comprise the same object of the N objects.

17. The non-transitory computer-readable medium according to claim 13, wherein the N objects selected by the first input comprise a first object; and the shooting, in response to the first input, a target video according to the N objects selected by the first input in the target video preview image comprises:
obtaining a first location of the first object in the target video preview image; and
shooting, according to the first location, a first sub-video comprising the first object,
wherein a second location of the first object in the first sub-video is associated with the first location.

18. The non-transitory computer-readable medium according to claim 13, wherein after the receiving a first input of a target video preview image, the operations further comprise:
obtaining an input parameter of the first input; and
determining shooting parameters of M sub-videos according to the input parameter, wherein the M sub-videos are sub-videos respectively corresponding to M objects of the N objects; and
the shooting a target video comprises:
shooting the M sub-videos according to the shooting parameters,
wherein M is an integer greater than 0, and M≤N.

* * * * *